(12) United States Patent
Lutze et al.

(10) Patent No.: US 7,073,759 B2
(45) Date of Patent: Jul. 11, 2006

(54) CAM MOUNTING CLAMP

(75) Inventors: Kenneth J. Lutze, Shorewood, WI (US); William K. Siebert, West Bend, WI (US); Pete J. Klein, Kenosha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 155 days.

(21) Appl. No.: 10/698,277

(22) Filed: Oct. 31, 2003

(65) Prior Publication Data
US 2005/0092880 A1    May 5, 2005

(51) Int. Cl.
*A47B 96/06* (2006.01)
(52) U.S. Cl. .............................. 248/231.31; 248/225.11
(58) Field of Classification Search ................ 248/317, 248/342, 343, 231.31, 222.13, 222.11, 229.11, 248/222.12, 222.41, 225.11
See application file for complete search history.

(56) References Cited

U.S. PATENT DOCUMENTS 5,169,106 A * 12/1992 Rasmussen .............. 248/230.3

* cited by examiner

*Primary Examiner*—A. Joseph Wujciak
(74) *Attorney, Agent, or Firm*—Quarles & Brady, LLP; Alexander M. Gerasimow (57) ABSTRACT

A mounting assembly is provided for fastening an HMI housing onto a panel. The housing includes a slot that is sloped with respect to the panel. A clamp is provided having an outwardly extending pin and connected flange that is inserted in the slot. The clamp is translated along the slot until engaging the panel wall, at which point the clamp is rotated in the slot to lock the clamp in position.

18 Claims, 6 Drawing Sheets

CAM MOUNTING CLAMP

CROSS-REFERENCE TO RELATED APPLICATIONS

BACKGROUND OF THE INVENTION

The present invention relates to industrial control systems generally, and in particular relates to a method and apparatus for mounting a human-machine interface onto a panel.

An automated manufacturing assembly typically includes a set of mechanical and electrical components, a controller and an interface device (e.g., a human-machine interface (HMI)). The mechanical and electrical components are integrated together to perform an automated manufacturing process. The controller is linked to a sub-set of the components (e.g., sensors) for receiving information regarding progression of the process and to another sub-set of the components (e.g., motors, actuators, etc.) for controlling progression of the process. The interface is typically linked to the controller to facilitate at least one of altering the process (i.e., altering process parameters) or monitoring the process. In particular, the interface generally includes an output terminal (such as a display) that provides data to the user that is relevant to the controlled process. Likewise, one or more inputs are typically provided that a user can engage to transmit information over the network to, for instance, the controller or controlled device.

While many different types of communication systems have been developed for linking the controller to the assembly components and to the interface, one particularly useful type of linkage is a network communication system, the Ethernet being an example. In the case of the Ethernet, for instance, an interface generates messages earmarked for the controller and transmits those messages onto the network. The controller listens on the network for messages earmarked for the controller and uses those messages to perform specific functions. Similarly, the controller earmarks specific messages for the interface and transmits those messages to the interface via the network.

Interfaces are typically mounted onto a panel having a front surface that faces the operator, and a rear surface that is generally inaccessible during normal operation. An opening is provided in the panel that receives the interface from the front. The interface is thus fastened to the panel at the rear panel surface. When mounting the interface, the rear of the panel is difficult to access and not visible by the user when stationed in front of the panel. In some instances, the rear panel surface can be accessed by the user. However, accessing the rear panel surface in order to mount an interface can be tedious and time-consuming, especially when mounting a plurality of interfaces onto a panel.

Accordingly, conventional mounting assemblies enable a user stationed in front of the panel to mount the interface on a blind rear panel surface. For instance, one typical mounting assembly includes a screw or other rotatable fastener that extends inwardly from the rear of the interface towards the rear surface of the panel that can be rotated until the fastener abuts the rear panel surface. Such fasteners must first be positioned in a threaded aperture, and are further ergonomically unfriendly to the user. Furthermore, when the fastener is rotated by the user, the fasteners will likely be blind to the user who is stationed at the front of the panel. As a result, under-rotation can compromise the mounting stability, while over-rotation can place excessive stresses on the fastening parts which can wear and fail over time.

What is therefore needed is a method and apparatus that facilitates mounting a HMI onto a panel in a less tedious and more reliable manner than conventionally achieved.

BRIEF SUMMARY OF THE INVENTION

In accordance with one aspect of the invention, a mounting assembly is provided for fastening an industrial control device housing onto a panel wall defining a front surface, a rear surface, and an opening extending therethrough for receiving the housing. The mounting assembly includes a housing including at least one side wall sized to extend through the opening. A slot extends through the side wall and is sloped from a distal location to a proximal location with respect to the panel wall. A clamp is provided including a clamp body that defines a first surface and a second surface. A shaft extends outwardly from the clamp body, and defines a distance to the first surface that is less than a distance defined between the shaft and the second surface. A flange extends outwardly from the shaft and is sized to be received in the slot. The clamp is configured to fasten the housing to the panel wall by inserting the flange into the slot, translating the clamp along the slot until the first surface is disposed proximal the panel wall, and rotating the clamp with respect to the panel wall until the second surface engages the panel wall.

The above aspects of the invention are not intended to define the scope of the invention for which purpose claims are provided. In the following description, reference is made to the accompanying drawings, which form a part hereof, and in which there is shown by way of illustration, and not limitation, a preferred embodiment of the invention. Such embodiment does not define the scope of the invention and reference must be made therefore to the claims for this purpose.

BRIEF DESCRIPTION OF THE DRAWINGS

Reference is hereby made to the following figures in which like reference numerals correspond to like elements throughout, and in which:

FIG. 2b is a schematic diagram illustrating various components of the HMI of FIG. 2a;

DETAILED DESCRIPTION OF THE INVENTION

Figure 1:
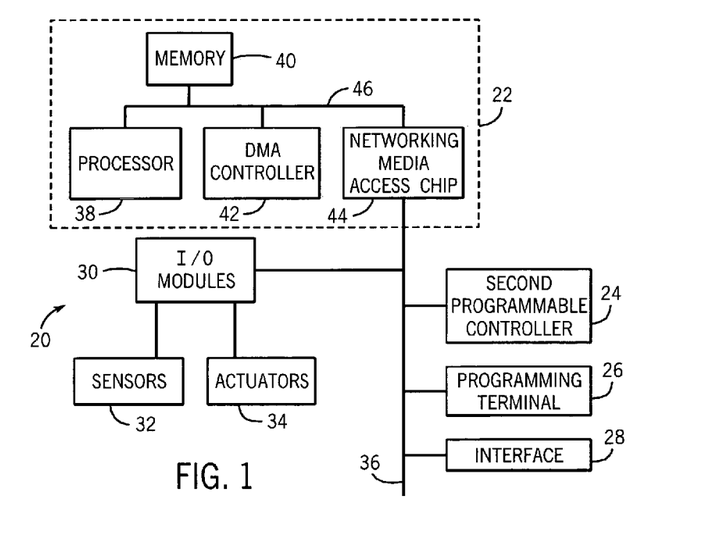
FIG. 1 is a schematic illustration of an industrial control system including an HMI in accordance with certain aspects of the invention.

Referring now to FIG. 1, there is shown an example of a network system 20, used for industrial automation. It should be appreciated that system 20 is provided only as an example of one of a multitude of systems that can incorporate a HMI, and that the present invention is not limited to the example described herein. Basically, network system 20 includes a first programmable controller 22, a second programmable controller 24, a programming terminal 26, a human-machine interface (HMI) 28, I/O module 30, sensors 32, actuators 34 and a communications medium 36.

Programmable controller 22 (e.g., a PLC.RTM.-5 available from Allen-Bradley Company, Inc.), includes a processor 38 (e.g., a 68340 microprocessor available from Motorola Inc.), a memory 40, a DMA controller 42 and a networking access media chip 44. These components are connected via a bus 46. It should be appreciated that programmable controller 22 will include other components which are not shown.

Memory 40 provides the storage for the schedule head array and cascading list, including pointers and data items. Memory 40 may also provide storage for the program code for processing, modifying and maintaining the cascading list and scheduling array.

DMA controller 42 controls access to memory 40 during a DMA cycle, as is well known in the art. Networking media access chip 44 provides an interface to communications medium 36, which will be described below.

Second programmable controller 24 is similar in arrangement to programmable controller 22. Programming terminal 26 provides means for configuring, modifying, debugging and maintaining network system 20. HMI 28 provides an operator interface for operating network system 20 to perform an automated industrial process.

I/O module 30 (e.g., 1771 adapter modules or FLEX I/O adapter modules available from Allen-Bradley Company, Inc.) provides an interface to sensors 32 and actuators 34. Sensors 32 can sense items such as temperature, pressure, flow rate of a fluid, torque, electrical current, etc. Actuators 34 control items such as switches and valves associated with fans, beaters, pumps, and the like.

Communication medium 36 will typically take the form of a cable, and may also include repeaters, routers, bridges, and gateways. In accordance with the preferred embodiment of the present invention, communication medium 36 is the ControlNet™ network from Allen-Bradley Company, Inc. ControlNet™ is a high-speed, deterministic, scheduled network for the transmission of time-critical application information.

Figure 2A:
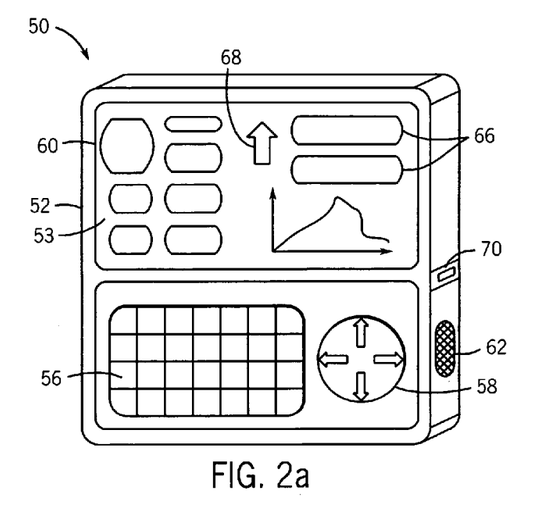
FIG. 2a is ; a perspective view of an exemplary HMI according to certain aspects of the present invention.
Figure 2B:
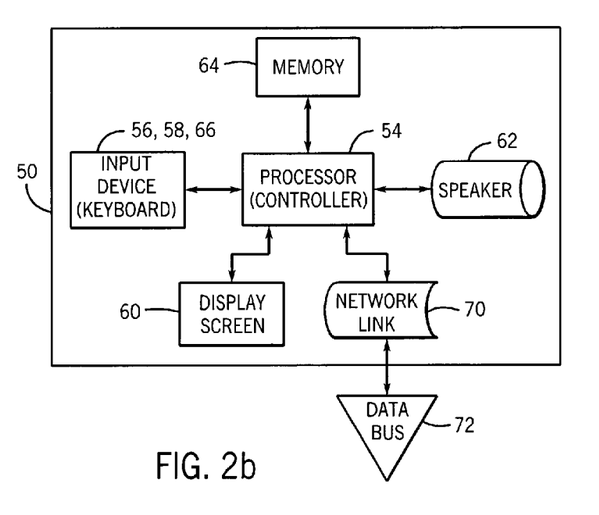

Referring now to FIGS. 2a and 2b, an exemplary HMI 50 and its internal components are illustrated. It should be appreciated that HMI 50 can be the same different HMI 28 as that described above with reference to FIG. 1. Furthermore, HMI 50 is provided only as an example of one of a multitude of HMIs that are compatible with the present invention, and that the present invention is not limited to the example described herein. Referring also to FIGS. 2a and 2b, it should be appreciated that exemplary HMI 50 includes a rigid plastic or metallic housing 52 in which various components are mounted onto a front surface 53 including a processor 54, input devices including a key board 56 and a rocker type cursor control button 58, a display screen 60, a speaker 62, and a memory 64. In addition, on screen functionality such as on-screen cursor selectable icons 66 and a movable cursor 68 illustrated in FIG. 2a are provided.

Importantly, referring again to FIGS. 2a and 2b, HMI 50 includes a connector 70 (eg: RJ-45 or other) allowing connection to a network link. As its label implies connector 70 is linkable to data bus 72 so that HMI 50 can communicate with a controller to provide information there to and receive information therefrom regarding the control process. It should be appreciated that connector 70 can be disposed on the rear surface of housing 50 in accordance with the preferred embodiment.

Figure 3:
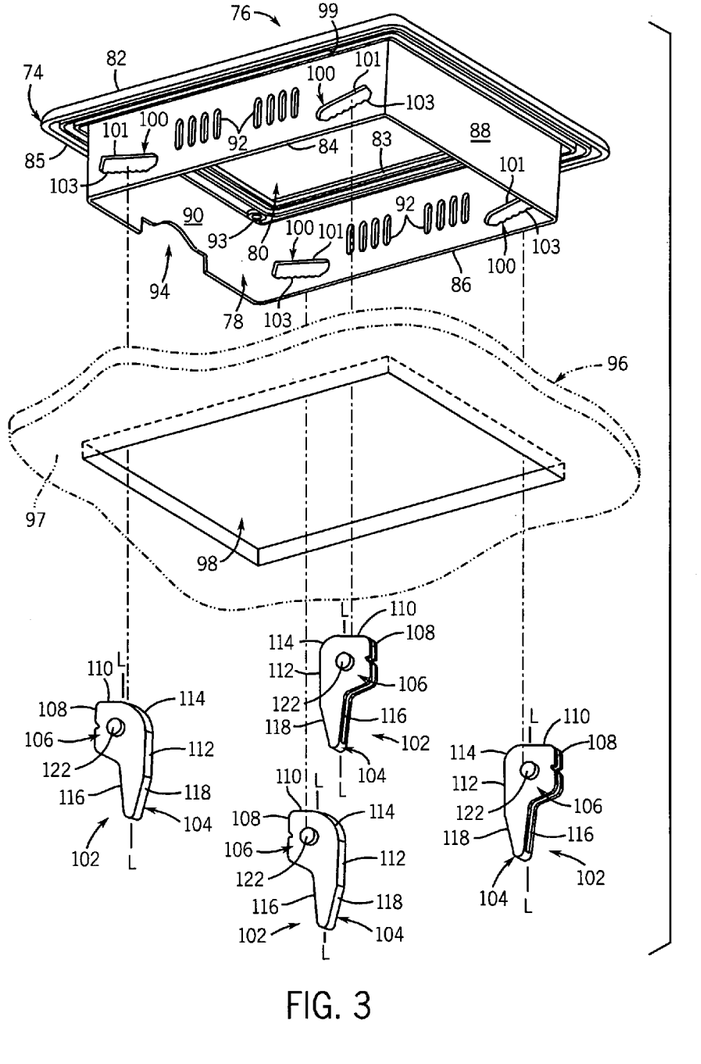
FIG. 3 is a perspective view of an HMI housing that is to be mounted onto a panel via a plurality of cam clamps constructed in accordance with the preferred embodiment of the invention.

Referring now to FIG. 3, a plastic housing 74 is provided that defines a front 76 and a rear 78. Housing 74 includes a laterally extending front wall 82 having a rectangular cut-out 80 extending there through that is sized to receive housing 52 of an HMI, such as HMI 50 described above. Alternatively, housing 74 can define a housing portion that is integrally connected to a HMI housing or a housing of any suitable device. Alternatively still, housing can itself provide the housing for a HMI or other suitable device. It should further be appreciated that aperture 80 can assume any shape and size configured to receive any suitable HMI or other panel-mounted device. For example, in an industrial control system, the device may take the form of a leader or follower node, or any other display panel.

A pair of opposing side walls 84 and 86 extends rearwardly from front wall 82 at the periphery of aperture 80. A pair of opposing end walls 88 and 90 extend rearwardly from front surface at the periphery of aperture, and join the outer ends of side walls 84 and 86. Side walls 84 and 86 and end walls 88 and 90 are preferably integrally connected. One or more apertures 92 extends through side walls 84 and 86 to provide a plurality of vents that enables cool air to travel across the HMI 50. A notch 94 is formed in the rear end of end wall 90 to provide a conduit for the network link. It should be appreciated that notch 94 could alternatively extend through either side wall, depending on the location of connector 70 on the HMI 50.

Wall 82 extends outwardly and slightly inwardly with respect to side walls 84 and 86 and end walls 88 and 90. The inwardly extending portion 83 of wall 82 facilitates mounting of HMI 50 via threaded aperture 93. A gasket 99 is disposed on the rear surface of the outwardly extending portion 85 of wall 82. Housing 74 is thus configured to be mounted onto a panel 96 including a wall 97 having an aperture 98 extending there through. Aperture 98 is sized slightly greater than the outer periphery defined by side walls 84 and 86 and end walls 88 and 90, but less than the outer periphery of wall 82. When mounted, gasket 99 provides a seal against panel 96 that prevents the leakage of moisture at interface between panel 96 and housing 74, complying with the splash test through NEMA 4X conditions.

A plurality of slots 100 are formed through side walls 84 and 86, and extend from a location proximal an interface with an adjacent end wall inwardly along the corresponding side wall. While four such slots 100 are illustrated, and extend through side walls 84 and 86, it should be appreciated that any number of slots (e.g., one or more) could extend through side walls 84 and 86 or rear walls 88 and 90 in accordance with the present invention. Slots 100 are sloped forwardly towards wall 82 in a direction of travel towards the nearest adjacent end wall. Each slot 100 defines opposing elongated side walls 101 and 103. Side wall 103 is disposed rearwardly with respect to side wall 101, and includes a plurality of adjacent teeth 105 that extend from side wall partially into the slot 100, and define corresponding adjacent arced engagement locations 107 (see FIG. 4). Each adjacent location 107 is separated by a tooth 105. Each slot 100 includes a keyhole 111 disposed at the outermost location with respect to wall 82 (see FIGS. 5 and 6). Keyhole 111 defines a larger slot opening than the remaining engagement locations 107.

A plurality of mounting clamps 102 is provided corresponding in number to slots 100. Each mounting clamp 102 extends generally along a longitudinal axis L-L, and includes a body 106 that defines a first generally flat longitudinally extending side wall 108. Side wall 108 is integrally connected to a flat laterally extending end wall 110. End wall 110 is joined to a second side wall 112 via a curved wall 114. The outer ends of side walls 108 and 112 are integrally connected to a handle 104. Handle 104 includes a pair of opposing side walls 116 and 118. Side wall 116 laterally opposes side wall 112, and is elongated with respect to side wall 118, thus providing a surface that is to be intuitively engaged by the finger of the user to lock the clamp 102 against panel 96, as will now be described.

Figure 4:
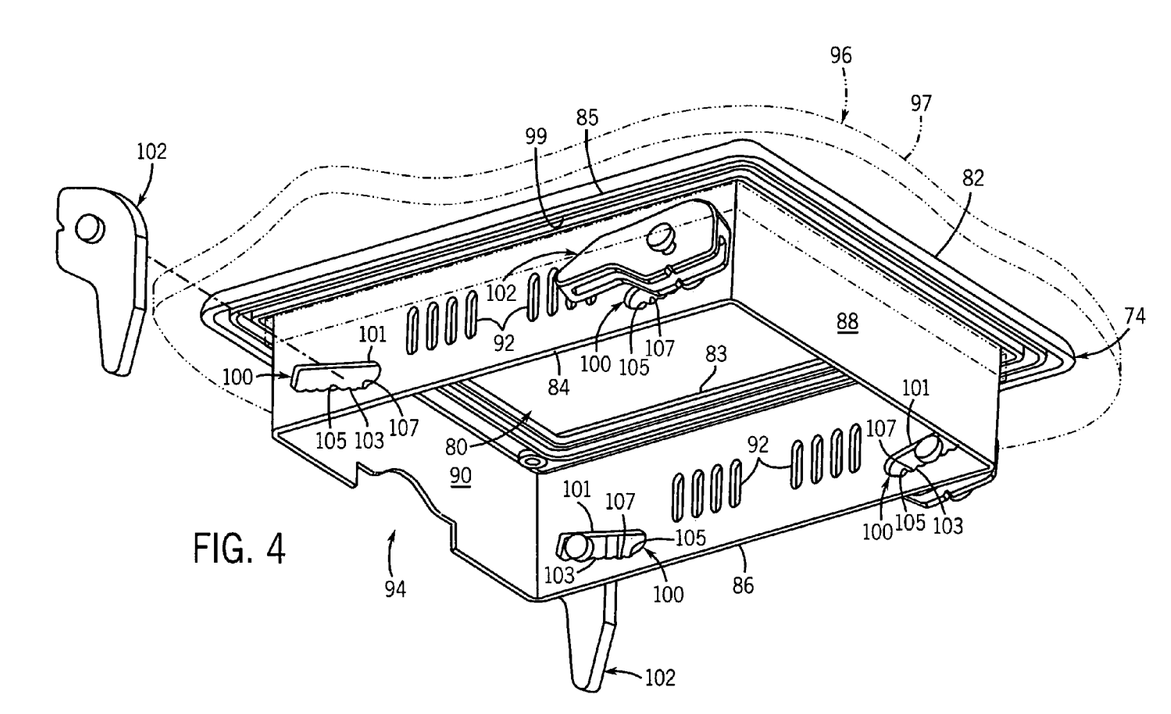
FIG. 4 is a perspective view of the HMI housing being mounted onto the panel.

In particular, referring now to FIG. 4, housing 74 is inserted into opening 98, such that side walls 84 ad 86, and end walls 88 and 90, extend through the opening while outwardly extending portion 85 of wall 82 (and in particular gasket 99) abuts the front surface of the panel wall 97 at a location adjacent the opening 98. When housing 74 is inserted into panel opening 98 in this manner, slots 100 are disposed behind the panel 96, and thus blind to a user stationed in front of the housing 74 (and HMI).

Figure 5:
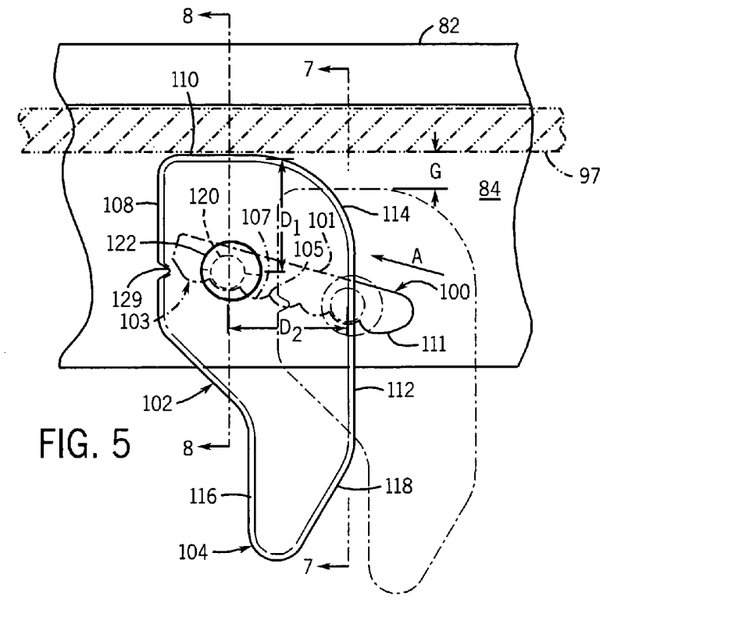
FIG. 5 is a fragemtary sectional side elevation view of the housing and panel illustrated in FIG. 4 illustrating a cam clamp being inserted in accordance with the preferred embodiment.
Figure 7:
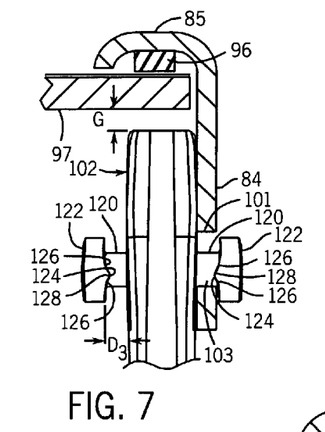
FIG. 7 is a sectional side elevation view taken along line 7—7 of FIG. 5.

As illustrated in FIGS. 5 and 7, each clamp includes a cylindrical shaft 120 extending outwardly from both sides of body 96. Shaft 120 has a radius substantially equal to the radius that defines arced engagement locations 107, though it should be appreciated that shaft 120 is not limited to a cylindrical shape and that shaft 120 can assume any shape compatible with the present invention. Shaft 120 is disposed on body 106 at a location such that the longitudinal distance D1 between shaft 120 and end wall 110 is less than the lateral distance D2 between shaft 120 and side wall 112. The distance between shaft 120 and curved wall 114 is less than distance D2 but greater than distance D1. The outer ends of shaft 120 are integrally connected to a head 122 or other suitable flange having any shape and size compatible with the present invention. In accordance with the preferred embodiment, head 122 is generally circular, and defines a diameter greater than the distance between engagement locations 107 and the opposing side wall 101. However, the keyhole 111 defines a distance to the opposing side wall 101 that is greater than the diameter of head 124.

The transverse distance D3 between head 122 and body 106 (i.e., the length of shaft 120) is slightly greater than the thickness of side walls 84 and 86. Each head 122 includes a pair of friction members 124 that extends inwardly towards body 106 from the laterally outer edges of head 122. Friction members 124 thus are laterally aligned with shaft 120. Friction members 124 define first and second walls 126 that extend inwardly from regions head 122 and converge to form a point 128. The transverse distance between point 128 and body 106 is less than the thickness of side walls 84 and 86.

Referring still to FIGS. 5 and 7, housing 74 is fastened to the panel 96 by first inserting a clamp 102 into a corresponding slot 100. As described above, the maximum distance between arced locations 107 and the opposing side wall 101 is slightly greater than head 122. Accordingly, head is inserted into keyhole 111, where end wall 110 is in a position furthest from panel wall 97.

It is also preferred (though not required) that clamp 102 is inserted such that Wall 116 faces the interface between the corresponding side wall 84 or 86 and the nearest end wall 88 or 90. This orientation will enable the clamp to be fastened without extending the handle 104 beyond the corresponding housing side wall 84 or 86, which is desirable when a plurality of HMIs are mounted onto a panel in close proximity.

The diameter of shaft 120 is less than the distance between teeth 105 and the opposing side wall 101. Accordingly, once clamp 102 is inserted into slot 100 such the head 122 clears side wall 84, clamp can be translated along the slot 100 in the direction of Arrow A.

Figure 8:
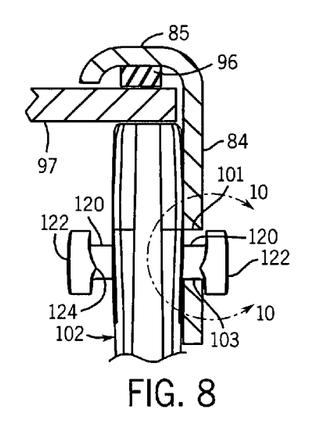
FIG. 8 is a sectional side elevation view taken along line 8—8 of FIG. 5.
Figure 10:
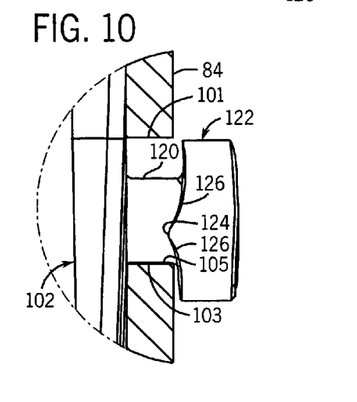
FIG. 10 is an enlarged sectional side elevation view taken along the line 10—10 of FIG. 8.
Figure 11:
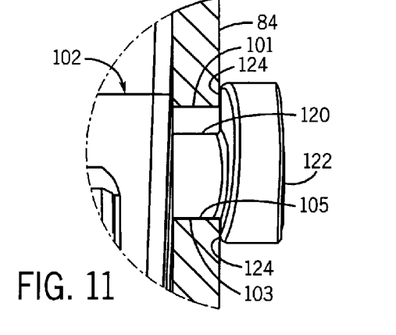
FIG. 11 is an enlarged sectional side elevation view taken along line 11—11 of FIG. 9.

Because the distance between the friction members 124 and body 106 is less than the thickness of wall 84, the clamp 102 should remain in an orientation that positions the friction members 124 in the slot 100 when translating the clamp along the slot 100, as illustrated in FIGS. 8 and 10. The desired position is achieved, if clamp 102 and slot 100 are configured as illustrated, when longitudinal axis L-L is generally perpendicular to side wall 84. If clamp 102 can be rotated slightly out of this perpendicular orientation, but over-rotation will cause friction member 124 to engage side wall 84 and prevent clamp translation.

As described above, clamp 102 is initially inserted into keyhole 111 such that end wall 110 and panel wall 97 are separated by a gap G. The clamp 102 is then translated along slot 100 in the direction of Arrow A until the user feels end wall 110 contact panel wall 97 (illustrated in FIG. 5). The position of location 107 engaged by clamp 102 when end wall 110 contacts panel wall 97 is dependent upon the panel wall thickness and distance D1.

Figure 6:
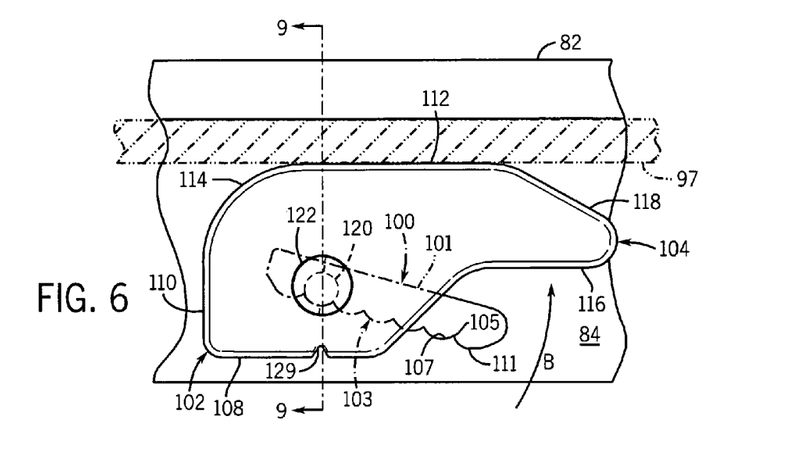
FIG. 6 is a fragmentary sectional side elevation view similar to FIG. 5, illustrating the cam clamp in a fastened position.
Figure 9:
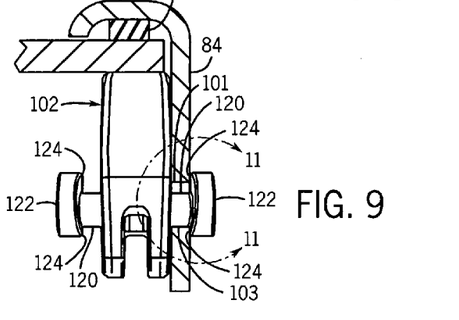
FIG. 9 is a sectional side elevation view taken along line 9—9 of FIG. 6.

Referring also to FIGS. 6, 9, and 10, once end wall 110 makes contact with panel wall 97, the user rotates clamp 102 counterclockwise along the direction of Arrow B by engaging side wall 116 with any finger, thereby causing curved wall 114 to cam against panel wall 97 and drawing housing 74 further towards the panel 96 and compressing the gasket 99 against panel wall 97. As clamp 102 is rotated, friction members 124 engage side wall 84 to prevent the clamp from slipping along the slot 100 and out of the proper location 107 as the clamp is rotated. Housing 74 becomes increasingly biased against panel wall 97 as clamp 102 is further rotated until side wall 112 abuts the panel wall 97, thereby locking the housing 74 against panel 96. Friction members 124 continue to engage side wall 84 at locations proximal walls 101 and 103 when the clamp 102 is in the locked position, thereby preventing clamp 102 from slipping along slot during use. It should be appreciated, however, that friction members 124 are not essential for maintaining the clamp 102 in the locked position, as the interference between tooth 105 and shaft 120 also prevent clamp 102 slippage.

Referring again to FIGS. 5 and 6, a notch 129 is formed in side wall 108 that a user can match with markings (not shown) present on side wall 84 that correspond to the position of the engagement locations 107. Accordingly, after one or more HMI housings have been mounted onto a panel in the manner described herein, the user can verify that the housings have been properly mounted by gauging the position of the notch 129 relative to the marking, it being appreciated that panels of various thicknesses will be rated to be fastened with notch 129 positioned at various corresponding markings.

The above-described process is repeated for all clamps 102 to fasten housing 74 to panel 96 at all slot locations. Advantageously, because shaft 120 and head 122 extend outwardly from both sides of body 106, any clamp 102 can be fastened in any slot 100. Furthermore, because the user can easily insert clamp 102 into slot 100 and feel the clamp end wall 100 abut panel wall 97, the user can fasten housing 74 to panel 96 blindly in an ergonomically friendly and reliable manner. Furthermore, because the force applied to panel wall 97 is predefined by the distance between shaft 120 and side wall 112, housing 74 can be fastened while avoiding the risk that housing 74 is either too tightly or too loosely mounted onto panel 97. The present invention thus achieves enhanced reliability with respect to conventional mounting assemblies.

The above has been described as a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. A mounting assembly for fastening a device housing comprising:
 a housing including at least one wall extending through an opening formed in a panel having a front surface, and a rear surface so that a flange of the housing abuts the front surface of the panel when the wall extends through the opening;
 a slot adjacent to the rear surface of the panel when the wall extends through the opening extending through the wall that is sloped from a distal location to a proximal location with respect to the panel; and
 a clamp including:
  a cam body rotatable about an axis having a first cam surface and a second cam surface displaced radially from the axis;
  a shaft extending along the axis from the cam body, wherein the shaft is displaced a first distance to the first cam surface that is less than a second distance defined between the shaft and the second cam surface; and
  a shaft flange at an end of the shaft extending radially outward from the axis and sized to be received and retained in the slot;
 wherein the clamp is configured to fasten the housing to the panel by inserting the shaft flange into the slot, translating the clamp along the slot until the first cam surface is disposed proximal the panel, and rotating the clamp relative to the panel until the second cam surface engages the panel.

2. The mounting assembly as recited in claim 1, wherein a curved surface joins the first cam surface to the second cam surface, and wherein the curved surface defines a third distance to the shaft that is between the first and second distances.

3. The mounting assembly as recited in claim 1, wherein the first cam surface comprises an end wall.

4. The mounting assembly as recited in claim 1, wherein the second cam surface is a side wall.

5. The mounting assembly as recited in claim 1, wherein the clamp further comprises at least one friction member extending inwardly from the shaft flange.

6. The mounting assembly as recited in claim 5,
 wherein the second cam surface is a side wall; and
 wherein the friction member defines a distance to the cam body that is less than a thickness of the side wall.

7. The mounting assembly as recited in claim 5,
 wherein the second cam surface is a side wall; and
 wherein the friction member engages the side wall when the clamp is rotated.

8. The mounting assembly as recited in claim 7, wherein the slot comprises a plurality of engagement locations separated by adjacent teeth operable to engage the shaft.

9. The mounting assembly as recited in claim 8, wherein the shaft is cylindrical and wherein the engagement locations define arced surfaces.

10. The mounting assembly as recited in claim 1, wherein a notch is formed in the clamp to gauge clamp position within the slot.

11. The mounting assembly as recited in claim 1, wherein the slot further comprises a keyhole operable to receive the shaft flange.

12. The mounting assembly as recited in claim 1, wherein the housing is adapted to house an industrial control device.

13. The mounting assembly as recited in claim 1, wherein the housing is adapted to house a human-machine interface.

14. A method for fastening an industrial control device housing onto a panel wall having a front surface, a rear surface, and an opening extending therethrough for receiving the housing, the method comprising:
 A) providing a housing including at least one side wall sized to extend through the opening so that a flange of the housing abuts the front surface of the panel wall when the wall extends through the opening, and a slot adjacent to the rear surface of the panel wall when the wall extends through the opening extending through the side wall that is sloped from a distal location to a proximal location with respect to the panel wall;
 B) a clamp including:
  i. a cam body rotatable about an axis having a first cam surface and a second cam surface displaced radially from the axis;
  ii. a shaft extending along the axis from the cam body, wherein the shaft is displaced a first distance to the first cam surface that is less than a second distance defined between the shaft and the second cam surface; and
  iii. a shaft flange at an end of the shaft extending radially outward from the axis and sized to be received and retained in the slot;
 C) inserting the flange shaft flange through the slot such that the first cam surface is separated from the panel wall;
 D) translating the flange shaft flange along the slot until the first cam surface is disposed proximal the panel wall; and
 E) rotating the clamp until the second cam surface abuts the panel wall.

15. The method as recited in claim 14, wherein step (C) further comprises inserting the shaft flange through a keyhole formed in the slot that is sized to receive the shaft flange.

16. The method as recited in claim 14, wherein step (D) further comprises translating the shaft flange between engagement locations that are separated by inwardly extending teeth.

17. The method as recited in claim 14, wherein step (E) further comprises engaging a friction member with the side wall.

18. The method as recited in claim 14, wherein step (E) further comprises engaging a curved surface with the panel wall, wherein the curved surface is positioned at an interface between the first cam surface and second cam surface.

* * * * *